US00RE36649E

United States Patent [19]

Jefferies et al.

[11] E Patent Number: Re. 36,649

[45] Reissued Date of Patent: Apr. 11, 2000

[54] APPARATUS AND METHOD FOR WASHING EXTERIOR BUILDING SURFACES

[75] Inventors: Jesse H. Jefferies, Houston, Tex.; James E. Jefferies, Santa Barbara, Calif.; Brad A. Bucher, Houston, Tex.

[73] Assignee: Sky Robotics, Inc., St. Paul, Minn.

[21] Appl. No.: 08/539,273

[22] Filed: Oct. 4, 1995

Related U.S. Patent Documents

Reissue of:

[64] Patent No.: 5,249,326
Issued: Oct. 5, 1993
Appl. No.: 07/534,097
Filed: Jun. 5, 1990

U.S. Applications:

[63] Continuation-in-part of application No. 07/334,895, Apr. 5, 1989, abandoned.

[51] Int. Cl.[7] ..... A47L 1/00

[52] U.S. Cl. ..... 15/50.1; 15/103

[58] Field of Search ..... 15/50.1, 50.2, 15/50.3, 103; 134/198, 199, 172; 114/222

[56] References Cited

U.S. PATENT DOCUMENTS

| | | | |
|---|---|---|---|
| 200,696 | 2/1878 | Cole | 114/222 |
| 894,628 | 7/1908 | Grant | 114/222 |
| 991,308 | 5/1911 | Holland | 114/222 |
| 1,471,935 | 10/1923 | Arentz | 114/222 |
| 1,592,882 | 7/1926 | Artas | 15/103 |
| 1,919,854 | 7/1933 | Masseau | 15/50.1 |
| 2,098,262 | 11/1937 | Temple | 114/222 |
| 2,288,791 | 7/1942 | Cullton | 134/93 X |
| 2,312,189 | 2/1943 | Petley | 15/50.1 |
| 2,718,656 | 9/1955 | Kirk | 12/103 |
| 3,298,052 | 1/1967 | Wolfe . | |
| 3,317,946 | 5/1967 | Anderson . | |
| 3,344,454 | 10/1967 | Mikalson . | |
| 3,486,512 | 12/1969 | Marino | 134/93 |
| 3,607,178 | 9/1971 | Dennison et al. | 65/30 |
| 3,715,774 | 2/1973 | Fannon, Jr. . | |
| 3,775,804 | 12/1973 | Hoener, Jr. . | |
| 3,863,393 | 2/1975 | Goff | 114/222 |
| 3,895,406 | 7/1975 | Fannon, Jr. . | |
| 3,902,513 | 9/1975 | Franz | 134/199 |
| 3,915,738 | 10/1975 | Willard, Sr. . | |
| 3,920,864 | 11/1975 | Greenberg et al. . | |
| 3,935,351 | 1/1976 | Franz . | |
| 3,999,242 | 12/1976 | Maruyama et al. | 15/103 |
| 4,049,555 | 9/1977 | Matnerne | 134/93 X |
| 4,095,378 | 6/1978 | Urakami . | |
| 4,112,535 | 9/1978 | Wild et al. | 15/302 |
| 4,240,174 | 12/1980 | Thiem et al. . | |
| 4,489,134 | 12/1984 | Yudenfriend . | |
| 4,502,172 | 3/1985 | Chandler . | |
| 4,556,446 | 12/1985 | Yudenfriend . | |
| 4,652,368 | 3/1987 | Ennis et al. | 134/111 X |
| 4,739,779 | 4/1988 | Jones et al. | 134/123 X |
| 4,783,868 | 11/1988 | O'Callaghan . | |
| 4,797,969 | 1/1989 | Caduff | 15/302 |
| 4,800,607 | 1/1989 | Fukutomi | 15/302 X |
| 4,809,384 | 3/1989 | Yokota et al. | 15/103 |
| 4,977,028 | 12/1990 | Goepfert et al. . | |

FOREIGN PATENT DOCUMENTS

| | | | |
|---|---|---|---|
| 1165082 | 9/1969 | United Kingdom | 15/302 |

*Primary Examiner*—Frankie L. Stinson
*Attorney, Agent, or Firm*—Dorsey & Whitney LLP

[57] ABSTRACT

A system for washing building windows and other exterior surfaces. The system uses substantially pure water as the washing medium, and uses a novel cable restraint system for restraining an automatic cleaning device against the building surface.

26 Claims, 7 Drawing Sheets

FIG. 13
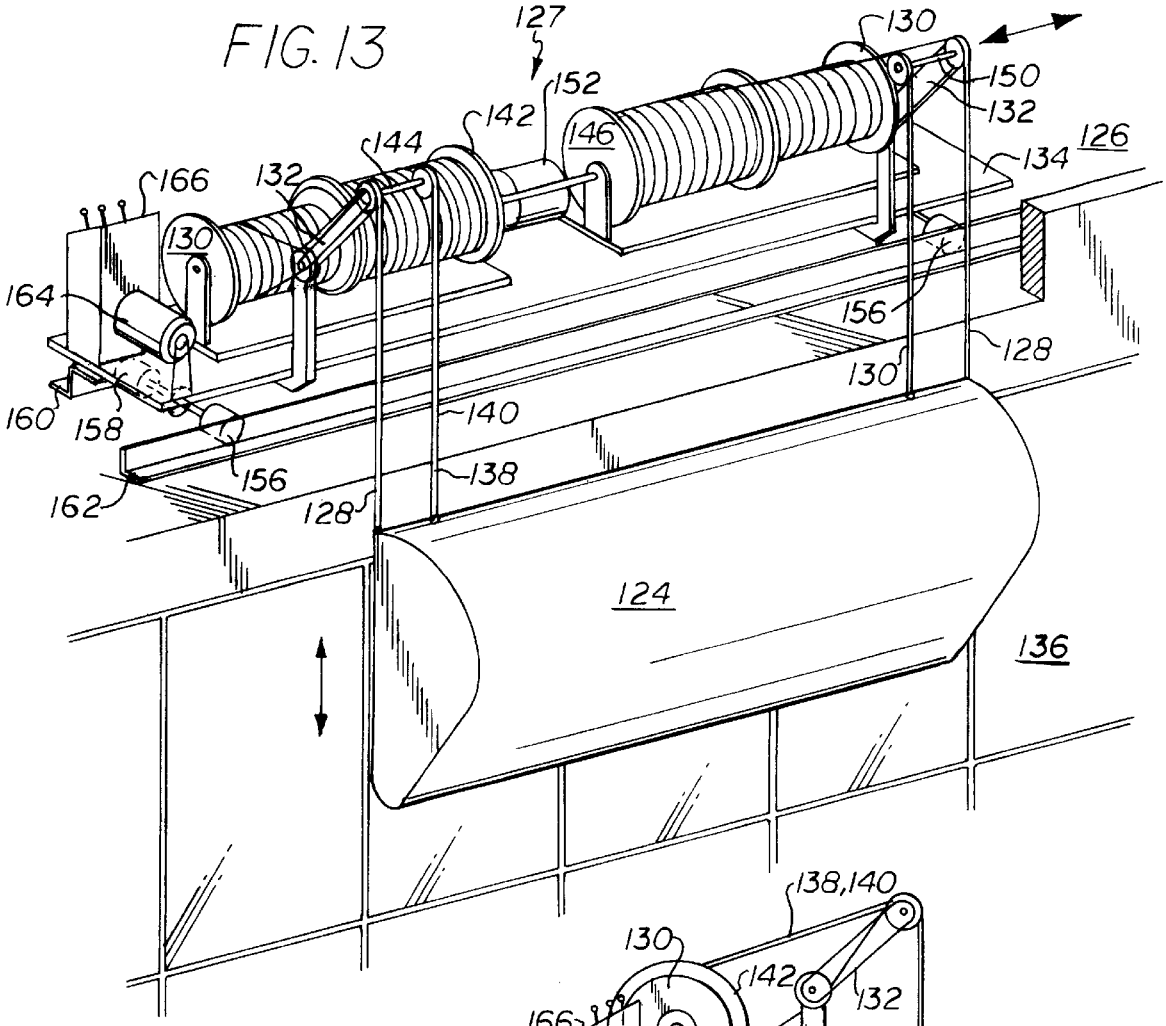
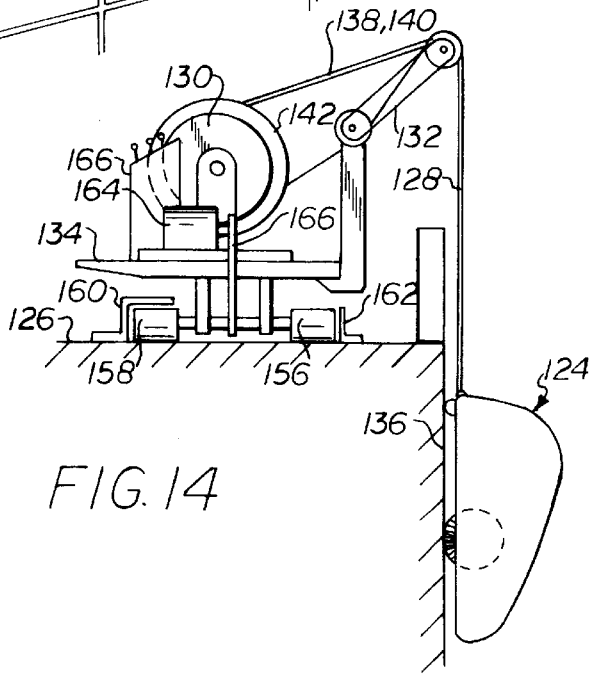
FIG. 14

APPARATUS AND METHOD FOR WASHING EXTERIOR BUILDING SURFACES

Matter enclosed in heavy brackets [ ] appears in the original patent but forms no part of this reissue specification; matter printed in italics indicates the additions made by reissue.

This application is a continuation-in-part of copending application Ser. No. 334,895, filed Apr. 5, 1989, and now abandoned.

BACKGROUND OF THE INVENTION

1. Field of the Invention

This invention relates generally to a system for washing windows and other exterior surfaces of buildings. In particular, it relates to a window washing system which uses substantially pure water to clean such building surfaces, and which uses a novel cable restraint system for restraining an automatic cleaning device against the building surface.

2. Description of the Related Art

Building structures, particularly tall urban buildings, are typically washed manually. A scaffolding structure is usually suspended from the top of the building to be washed. The scaffolding can be raised or lowered so that a person standing on the scaffolding can wash the windows and exterior surfaces of the building by hand. After a vertical section of the building is washed, the scaffolding is repositioned laterally so that the next adjacent vertical section of the building may be cleaned. This procedure may be repeated until the entire building has been washed.

Manual washing of buildings has proven to be quite dangerous, especially with respect to tall skyscrapers. Typical wind and air drafts surrounding a building can exert a significant aerodynamic force upon a scaffolding structure, causing it to swing out and away from the building, and placing persons standing on that scaffolding in peril. Injuries from manual window washing operations are common, and have caused insurance rates to soar. Typically, the cost of insuring a window washing operation can reach 40% of the labor costs. Furthermore, the manual washing of building exteriors is slow and labor-intensive.

Effectively removing mineral deposits from building windows has been a problem which has long plagued the industry. Normal water supplies conventionally used for wash water contain some amount of dissolved solids, including calcium, magnesium, and sodium in the form of bicarbonates, carbonates, chlorides, or sulfates. Regardless of the type or form of the dissolved solids, when a water droplet is allowed to dry on a surface, the solids typically remain as deposits on the surface.

When washing a window, a single water drop left on the surface will typically contain between 300 and 1000 parts per million of dissolved solids, in addition to varying amounts of suspended solids removed from the surface by washing. When water drops evaporate, mineral deposits are left in "spots". Compounding the spotting problem is the fact that when a window is being cleaned in sunlight, the surface of the window can be elevated to as much as 120° F. Wash water in such circumstances evaporates quickly and can be seen to "steam" off of the window. Heavy and ultimately damaging mineral deposits can result.

Surface active agents (i.e. cleaning agents), such as polyphosphate and organic detergents, serve to spread adhering water drops over a wider area, making water spotting less noticeable. However, the effect is only cosmetic as the accumulation of hard mineral deposits as a whole is unaffected.

Although various automatic window washing devices have been described in the art (see, for example, U.S. Pat. No. 3,344,454 and 3,298,052), the inventor is not aware of any such devices which have proven to be practical or accepted in use. Such devices typically employ mechanical techniques to scrub the surface and to remove residual water. These cleaners suffer from a combination of several problems. First, many require some form of tracking (e.g., vertical mullions) on the building facade to guide the device up and down and maintain cleaning contact with the surface. Second, many include elaborate mechanical water collection and liquid removal apparatus, adding weight and expense to the overall device. Finally, since it is difficult to completely remove all of the wash water from the surfaces, and since all devices known to the inventor use common tap water (with or without detergents) as the washing medium, they tend to clean ineffectively, leaving mineral deposits from the tap water itself.

It would be an advance in the art if a window washing system were made which would be practical and effective in use and would avoid the need for persons to be suspended on scaffolding over the side of a building. It is accordingly an object of this invention to provide a washing system which can address the disadvantages of the prior systems.

SUMMARY OF THE INVENTION

One broad aspect of this invention relates to a window washing system which uses substantially pure water as the washing medium. Another aspect relates to a washing system which uses a novel restraining system for restraining an automatic cleaning device against the building surface to be cleaned. Various preferred embodiments incorporate one or both of these features in the washing system, as explained in more detail below.

The term "substantially pure water" is used herein to mean water which is substantially free of dissolved solids (i.e. water which is substantially deionized or demineralized). Such water may be obtained, for example, by substantially purifying water from a public source through reverse osmosis, ion bed exchange, or other conventional techniques. Preferably, such water is purified to an extent that its total dissolved solids content is less than about 200 parts per million, more preferably less than about 100 parts per million. For optimum cleaning efficiency, the total dissolved solids content of water should be less than about 20 ppm. As should be apparent, the purer the rinse water, the better it will serve as the rinsing medium, but cost considerations may dictate the level of water purity desired. Conventional means may be able to achieve less than about 1 ppm total dissolved solids in the rinse water.

In one embodiment of this invention, a system for washing windows and other exterior surfaces of a building is provided, comprising a washing unit including scrubbing means for scrubbing the building surface, and rinsing means for spraying water on the scrubbed building surface. (The terms "washing unit" and "cleaning device" are used synonymously herein). Means are provided for suspending the washing unit in contact with the building surface to be washed, and for causing the unit to traverse the building surface. Water supply means are provided for delivering water to the washing unit. Finally, water purifying means are associated with the water supply means for substantially purifying water delivered to the washing unit.

By using substantially pure water as the rinsing medium, the water need not be removed from the surface (i.e. the surface need not be dried) in order to avoid spotting of the surface after washing. Thus, this embodiment of the invention may eliminate the need to include a blower or other mechanical means for removing the water from the wash surface. This provides a substantial advantage in reducing the cost and weight of conventional washing units.

Preferably, the system further comprises means for restraining the washing unit against the building surface to be washed. The restraining means may comprise conventional tracking or mullions attached to the exterior building surface, but preferably comprises the novel cable restraining system provided by this invention, as described in further detail below.

The suspension means may take the form of a cable attached at one end to the washing unit, and at the other end on or near the top of the building. Alternatively, the unit may be suspended by engagement with tracking or mullions on the building facade (the tracking thus serving as both suspension and restraining means).

Generally, it is preferable to maintain the wash water substantially within the peripheral boundaries of the washing unit during washing operation. For this purpose, the scrubbing means of the washing unit may comprise a rotatably mounted brush, having bristles oriented in a helical pattern with right and left pitch, such that upon rotating the brush in use in a downward direction across the building surface, the rinse water will be directed toward the center of the washing unit. The device may also include sealing strips, strip brushes, or the like around the periphery of the inner side of the device to keep water from escaping outside its boundaries.

Also, the washing unit may include a trough or reservoir for collecting waste water, and the system may include means operatively associated with the washing unit for removal of waste water from the trough during use. In this way, the waste water may be collected in the device itself, and not allowed to flow down the surface of the building during cleaning operation.

Preferably, the water supply means is operable to deliver water to the washing unit at a rate of from about 0.5 to about 3 gallons per 100 square feet of surface area cleaned. More preferably, the water supply rate is from about 1 to about 1.5 gallons per 100 square feet.

In a preferred embodiment, the washing unit is articulated into a plurality of sections for cleaning adjacent angled surfaces of a building, including curved surfaces.

As mentioned above, another aspect of this invention relates to a novel restraining system, which will now be summarized. In this embodiment of the invention, the washing system comprises (as above) a cleaning device for cleaning exterior surfaces of buildings, means for suspending the cleaning device in contact with the building surface to be cleaned, and means for causing the washing unit to traverse the building surface to be cleaned. Means for restraining the cleaning device against the building surface to be cleaned are provided, said restraining means including a restraining cable having a free weight attached thereto, means for attaching the restraining cable to the building at a point above the cleaning device, and a member for attaching the restraining cable to the building at a point below the cleaning device, the member being mounted on a suction cup adapted to engage the building. In use, the restraining cable is attached to the building at a point above the cleaning device, then passes over the cleaning device, and is threaded through the member below the cleaning device, such that the free weight hangs below the member and exerts a downward force on the cable, and the cable thereby restrains the cleaning device against the building surface to be cleaned. Preferably, the member connected to the suction cup comprises a pulley. Alternatively, it may be a loop, a U-shaped piece, or any other structure having a bore or passage through which the restraining cable can pass.

It should be understood that the term "cable" as used herein includes cables, wires, ropes, link chains, and like structures. Also, when it is said that a part is attached or connected to another part, it should be understood that the two parts may be directly attached or connected to each other, or indirectly attached or connected via intermediate parts.

In a preferred embodiment, the cleaning device includes a pulley mounted thereon for the restraining cable to pass over, facilitating movement of the cleaning device across the building surface to be cleaned. A compression spring preferably separates the pulley and cleaning device, so that the pulley can move laterally towards and away from the cleaning device as the cleaning device traverses the building surface to be cleaned. As should be understood, the spring will be compressed to its greatest extent (and the pulley will be closest to the device) when the device is nearest the points at which the restraining cable is attached to the building, i.e. at the upper and lower points of the device's travel. As the device descends from its uppermost point to the middle of the building, the force exerted by the restraining cable on the spring will generally decrease, and thus the pulley will move away from the device. Then, from the middle of the building to the bottom of the descent, the force exerted by the restraining cable on the spring will increase, and the restraining cable will thus push the pulley towards the device.

It should be appreciated that the preferred restraining system provided by this invention provides means for restraining a suspended washing device without the need for mullions or other tracking systems to be fixed to the building facade. Thus, the restraining means of this invention can be used in conjunction with smooth or non-smooth building surfaces.

In another embodiment of this invention, a method is provided for washing building windows and other exterior surfaces. A washing unit is suspended from a building such that the washing unit maintains contact with the building surface to be washed, the washing unit including scrubbing means and rinsing means as described above. A source of substantially pure wash water is provided and delivered to the washing unit. The washing unit is activated so that the unit scrubs the building surface, and rinses the scrubbed surface with the substantially pure wash water.

BRIEF DESCRIPTION OF THE DRAWINGS

This invention is now described by reference to the appended drawings which illustrate particular preferred embodiments of the system provided by the present invention.

FIG. 13 is a perspective view of a washing system as provided in a preferred embodiment of the present invention.

FIG. 14 is a side view of the system shown in FIG. 13.

DETAILED DESCRIPTION OF PREFERRED EMBODIMENTS

Preferred embodiments of this invention combine mechanical cleaning with specially treated water, thereby minimizing the need for complete water removal to avoid spotting.

A preferred embodiment of this invention combines controllable brush pressure with a suspension/restraint system and complete demineralization of the wash water by either ion exchange or reverse osmosis, thus significantly reducing the spotting problem. As a result, the need for blowers, squeegees, and liquid collection systems that make for heavy and complex mechanical devices may be eliminated.

Prior art systems generally did not address water quality beyond filtration of recirculated wash water. Mineral deposits were thus not eliminated even though massive mechanical configurations were built to minimize residual water.

One aspect of this invention relates to the use of substantially pure water as the washing medium. Preferably, the cleaning water used in the system of this invention is deionized by either reverse osmosis or by mixed bed ion exchange, reducing dissolved solids to around 1 to 20 parts per million. By appropriate selection of specific membranes for the applied reverse osmosis or ion exchange units, the low level of dissolved solids may be composed of sodium salts that leave loosely adhering deposits that are highly soluble in subsequent rain on the glass surfaces.

Preferred water supply rates may vary depending on the width of the cleaning unit and the drop rate in use. For a four foot wide unit at a drop rate of 20 feet per minute, 50 gallons of wash water per hour is generally an effective water supply rate. For a ten foot wide unit at the same drop rate, 120 gallons per hour is typically effective. Preferably, the water supply rate is from about 0.5 to about 3 gallons per 100 square feet of surface area cleaned; more preferably, from about 1 to about 1.5 gallons/100 $ft^2$.

Figure 1:
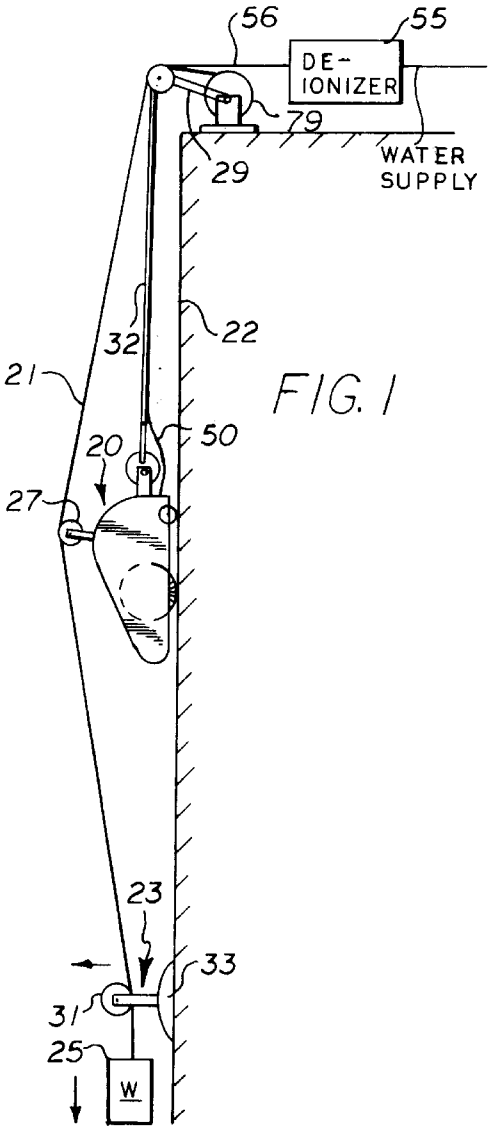
FIG. 1 is a building window washing system as provided by a preferred a embodiment of the present invention.

FIGS. 1–8 illustrate a preferred embodiment of a washing system as provided by this invention. As illustrated in FIG. 1, substantially pure (deionized) water is provided to the device 20 by means of a water supply line 56 which may be connected to a deionizer 55 at the top of the building. The deionizer 55, in turn is connected to a water supply (not shown) from the building.

The wash water is preferably conditioned by the deionizer 55 using reverse osmosis, electrical dialysis, or ion exchange resins such that the total dissolved solids are less than about 200 parts per million.

Another aspect of this invention relates to a wire guidance system for the window washing device. The system functions as a restraining means to guide the washing unit in a vertical direction up and down the building regardless of wind conditions, and to keep the unit in continuous contact with the surface to be cleaned.

In the embodiment illustrated in FIG. 1, the restraining means comprises four components: (1) a wire rope or cable 21 that drops the entire height of the surface 22 to be cleaned: (2) a suction cup device 23 that is secured onto the building surface near the base of the building; (3) a counter weight 25 (or weights) which are attached to the wire rope 21 at the base of the system to create tension on the line (the preferred amount of the weight may vary based on the height of the building); and (4) a pulley system 27 that is mounted on the washing device 20.

In use, the wire rope 21 is extended the entire length of the surface 22 to be cleaned. It may be secured on the roof to a davit system 29 and at the base of the building to the suction cup device 23 secured to the building. The wire 21 functions to guide the washing unit 20 in a fixed vertical direction and also to maintain full brush contact with the surface 22 to be cleaned. The tension of the wire 21 can be adjusted with counter weights 25 attached to the lower end of the rope. Generally, the higher the building, the more weight which should be attached.

In the embodiment shown, the wire line 21 moves freely through the suction cup device 23 with the assistance of a pulley 31 mounted on the suction cup 33. The weight 25 may be secured to the line 21 with a clip or other suitable means. The weight 25 should hang freely (not in a resting position on the ground, etc.) so the wire 21 will experience a constant pressure.

Figure 3:
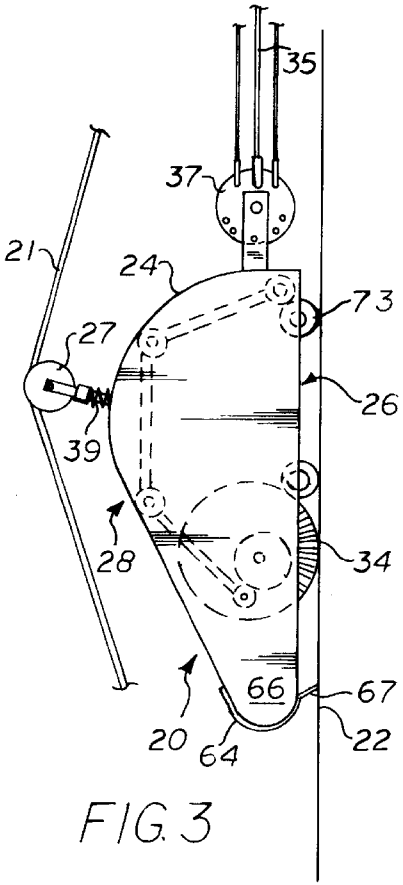
FIG. 3 is a side view of the suspended washing device of FIG. 2.

As best shown in FIG. 3, the washing unit 20 preferably has a block pulley 27 mounted at the center of unit for the wire rope 21 to travel over. The pulley 27 may be designed with a spring 39 in the sleeve, allowing the pulley to extend or retract according to the line pressure at that particular location. This enables the washing device 20 to maintain contact with the surface 22. As should be appreciated, as the unit 20 is lowered towards the middle of the building, the pressure of the line 2 decreases. The pulley 27, with the assistance of the spring 39, moves outward to maintain a constant pressure. In use, the spring 39 is compressed to the greatest extent at the top and bottom of the building and extends outward gradually as the machine 20 approaches the middle of the building.

As should be appreciated, the cable restraint system is configured to cause an inward thrust on the washing unit 20, facilitating good brush contact with the surface 22. Additional weights can be added to the cable system safely at the ground level to increase brush pressure, if desired. A safety line (not shown) may be attached at the top to the lift davit 29 and at the bottom at ground level.

By using the preferred restraining system, the washing device of this invention is able to clean buildings having a smooth facade, not requiring vertical mullions or other tracking to be attached to the exterior building surface. Thus, use of preferred embodiments of this invention is not restricted to any particular building facade or construction, nor are modifications or mechanical adaptation to the building surface to be cleaned required.

Referring again to FIG. 1, the unit may be raised and lowered by a cable lift mechanism driven by an electric gear motor affixed to the davit 29 located on the building roof. For optimum cleaning effectiveness, the unit drop rate is preferably less than about 30 feet per minute, more preferably less than about 20 feet per minute. The davit 29 may be equipped with wheels such that the unit can be sequentially moved around the edge of the building as washing progresses.

Referring now particularly, to FIG. 3, the washer device 20 is shown suspended and restrained against the building surface 22 to be cleaned. The entire mechanism 20 may be encased in a housing 24 that collects dirty wash water which may be drained to the base of the building for disposal. The housing 24 has an inner side 26 facing and in contact with surface 22, and an opposed rear side 28 facing away from the building in operation.

The housing 24 preferably comprises a cover mounted on an anodized aluminum frame, which may be made of, e.g., 1 inch×1 inch box tubing. Aluminum is preferred as the material choice for the frame for its low-cost, light weight and resistance to oxidation. Steel may alternatively be used but is heaver and susceptible to rust. Other materials, such as magnesium, may be used as a matter of design choice. The housing cover is preferably made of a thermoplastic material, such as Xenoi, to provide high resistibility to impact and temperature changes and allow for vacuum forming the shape of the cover into aerodynamically superior designs. Xenoi is also a particularly suitable material as it will easily bond with paint.

The overall dimensions of the device 20 may be, for example, on the order of 4 to 10 feet in length and 3 feet in height.

Figure 2:
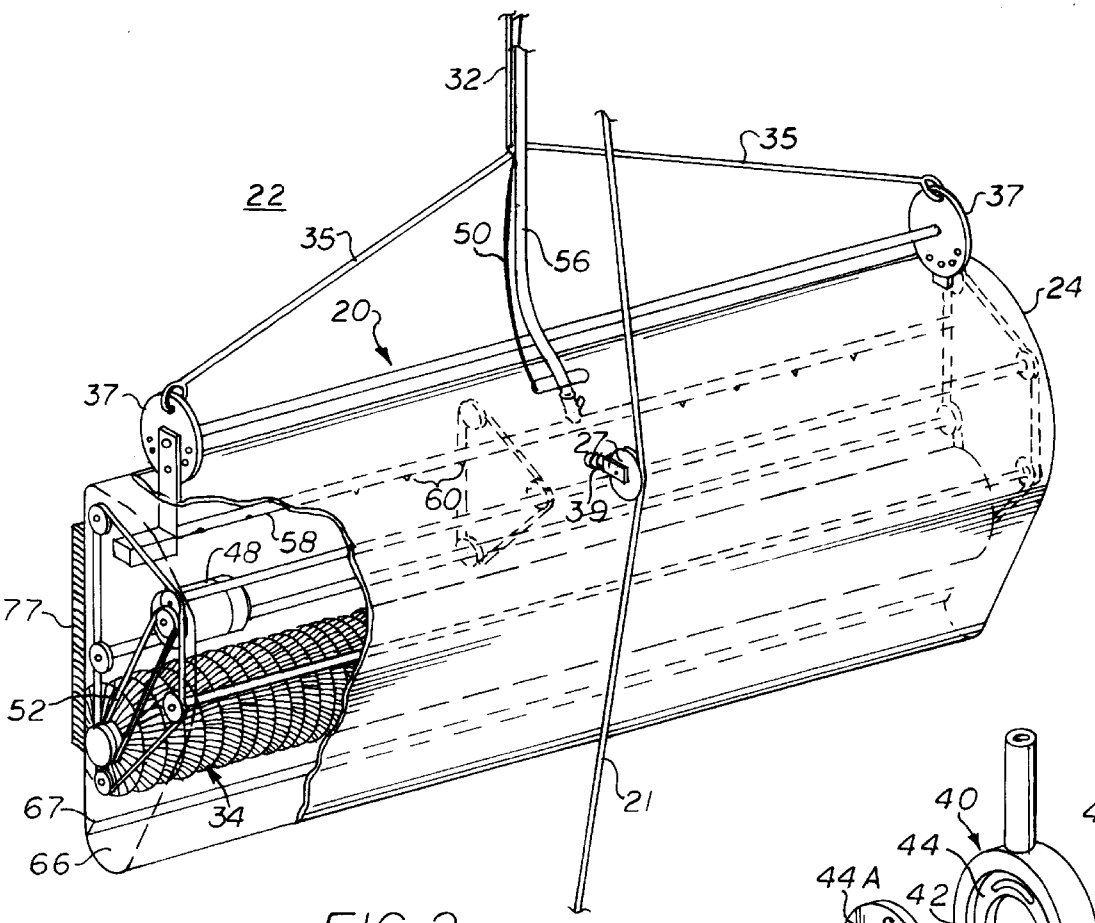
FIG. 2 is a partially sectional, perspective view of the suspended washing device shown in FIG. 1.

As shown in FIGS. 1 and 2, the device 20 is suspended by a cable 32, or other suspension means such as rope, chain, or wire. Any conventional means may be used to attach the cable 32 to the device 20. Preferably, as shown in FIG. 2, cable 32 splits into two sections 35 for attachment to the upper corners of the device 20. Alternatively, the device 20 could be suspended by two or more cables if desired.

Figure 7:
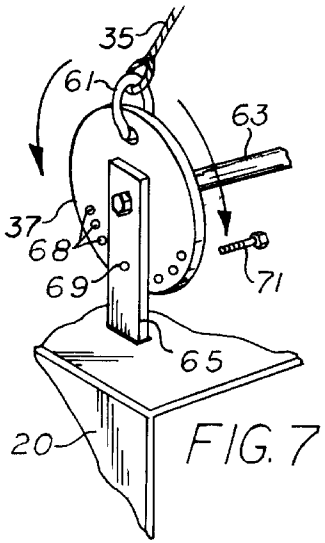
FIG. 7 is a fragmentary, perspective view of the device of FIG. 2, illustrating an offset support assembly for aligning the device with respect to the building.

As shown in FIG. 7, means may be provided for adjusting the alignment of the device 20. For this purpose, each cable section 35 may be attached via link 61 to a wheel 37, which is rotatably mounted to a plate 65 fixed to the upper corner of the washing device 20. The wheel 37 includes several holes 68, and the plate 65 includes a similarly dimensioned hole 69, through which a locking bolt 71 may be inserted. The other cable section is similarly attached to the other side of the device 20 (see FIG. 2) via another wheel 37. The two wheels may be connected by a crossbar 63. By removal of the bolt 71, the wheels 37 may be rotated for alignment of any of the holes 68 with the hole 69, and the bolt 71 may be reinserted at the desired position. As should be appreciated, this enables the alignment of the machine 20 relative to the surface 22 to be washed.

The cable 32 is wound around a spool 79 of the davit system 29, so that it may be rolled out to lower the cleaning device 20, and retracted to raise the device. The water supply line 56 may also be spooled in the davit system, but for simplicity is preferably allowed to hang over the building freely, being connected at its lower end to the machine 20.

Figure 5:
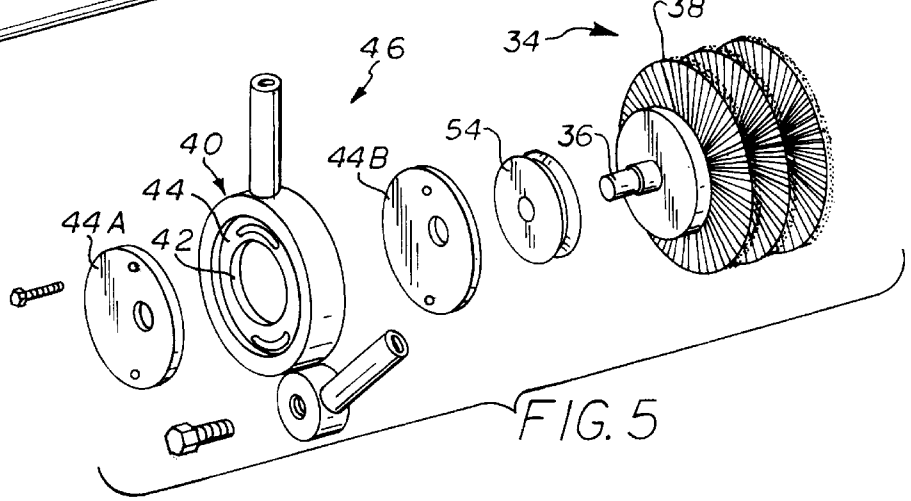
FIG. 5 is an exploded view of FIG. 4 in relation to the brush and the cam adjustment fittings.

For cleaning operation, a brush 34 is contained within the housing 24 and exposed at the open portion of the inner side 26 of the housing. Referring particularly to FIG. 5, the brush includes a shaft 36 with bristles 38 extending therefrom. The shaft 36 preferably comprises a one-inch hollow aluminum core which holds spiral wound polypropylene bristles 38 having flagged ends. The bristles 38 may be, e.g., approximately five inches long.

Figure 4:
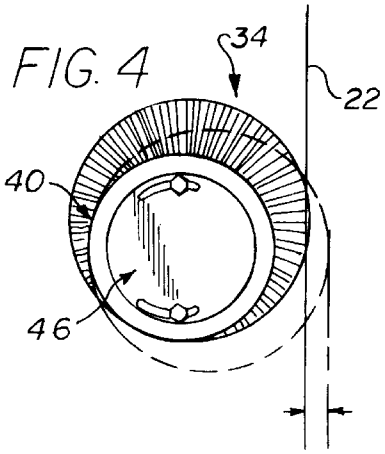
FIG. 4 is a fragmentary, end view of the device shown in FIG. 2, illustrating an offset cam adjustment for setting the brush position.

As illustrated in FIGS. 4 and 5, the brush contact pressure against the building surface 22 may be adjusted by means of an off-set support of the brush shaft. FIG. 5 illustrates the components rotatably connecting a shaft 36 to housing 40. Shaft 36 extends through a keyed flywheel 54 into a bearing 42 which is held in a bearing housing 44. Bearing housing 44 is composed of two identical disks, 44a and 44b. Bearing 42 is located approximately one and one half inches from the geometric center of disk 44a and 44b such that rotation of disks 44a and 44b causes shaft 36 to move closer to or further away from surface 22, thereby changing brush contact pressure on surface 22. Disks 44a and 44b are held in bearing assembly 46 which is integral with frame 40.

FIG. 4 is an end view of bearing assembly 46 which illustrates how it functions as an offset cam to adjust the relative position of brush 34 and surface 22.

Referring again to FIG. 2, brush rotation is driven by a motor 48 mounted to the housing frame. An electrical line 50 is connected to a power source atop the building to provide power to the motor 48. The motor may be, for example, a ¼ Hp/120 v, single phase, 120 rpm motor, belt driven. As with the water supply line 56, the electrical line 50 may be spooled at the top of the building, but for simplicity is preferably allowed to hang freely along the side of the building.

The drive motor 48 is connected via a grooved belt 52 to a flywheel 54 (see FIG. 5). The flywheel 54 is in turn connected to the shaft 36. An idle arm may be provided to take up slack in the belt 52 during use. As will be appreciated, rotation of the motor drive shaft effects rotation of the brush 34.

Figure 6:
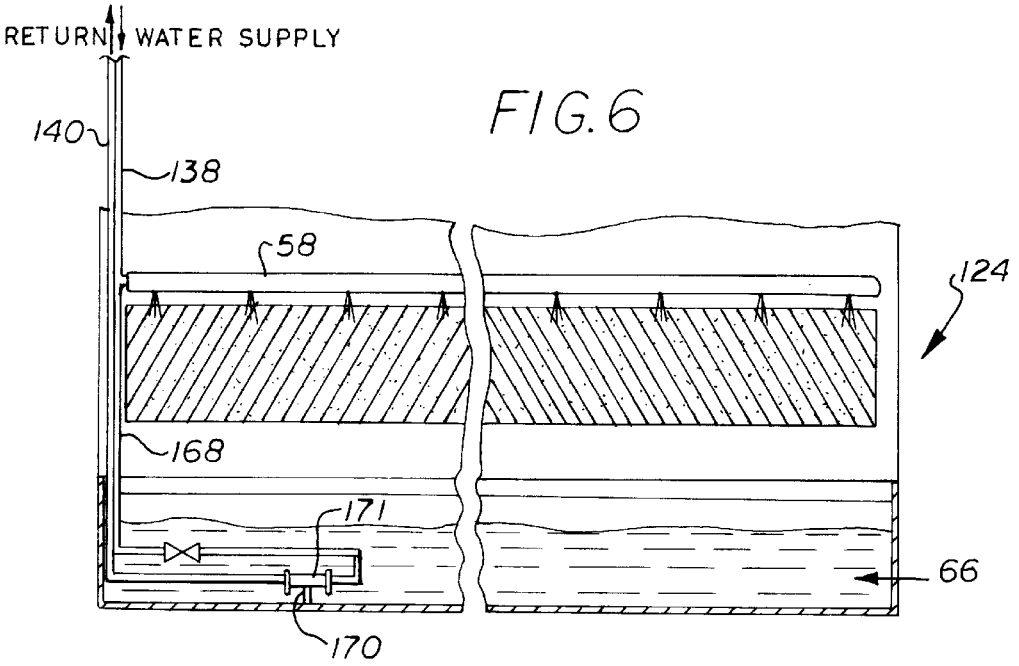
FIG. 6 is a view of the device from the interior of the building being cleaned, schematically illustrating the inverted helical pattern of the brush bristles.

FIG. 6 illustrates a preferred design of the brush bristle pattern. The device 20 is seen in FIG. 6 from the interior of the building being cleaned as it is descending the building. As illustrated, the bristles of the brush 34 are arranged in two strips, one strip 41 spiraling from the left end of the core to the middle of the brush, and the other strip 43 spiraling from the right end of the core to the middle. The spiral direction of the two strips 41 and 43 are inverted (i.e. mirror-image) relative to each other, such that the strips meet in an upside down V at the center of the brush, as shown. In this way, as the brush rotates downward (as shown in FIG. 6) across, the building surface during cleaning operation, water from nozzles 60 will be directed by the bristle pattern in an inward and downward motion, as shown by the arrow in FIG. 6. This minimizes water being sprayed outside the left and right ends of the device during use.

In a preferred embodiment, the cylindrical brush is rotated such that the cleaning motion is downward across the building surface at a brush tip speed of 4 to 12 feet per second. (Typically a 12 inch diameter brush driven at 135 RPM.) The brush may be constructed using 3 to 4 inch bristles oriented in a helical pattern with right and left hand pitch such that brushed wash water migrates toward the center of the device for disposal.

As shown in FIG. 2, substantially pure rinse water from the deionizer 55 is sprayed onto the building surface 22 by an ejector assembly which includes a spray tube 58 mounted to the housing frame and running the length of the device 20, preferably about 3 to 10 inches above the brush contact point. The tube 58 includes a plurality of spray nozzles 60. The nozzles 60 may be spaced apart at. e.g., 10 inch intervals down the length of the spray tube 58. The spray nozzles 60 may be provided with wide angle jets to eject the supply water as a wide spray.

The device 20 may include a fender or trough 64 connected to or integrated with the housing 24, to reduce water cascade that might make perimeter sidewalls wet. The fender 64 may be made of polypropylene or other suitable material. The lower portion of the fender 64 is shaped to create a waste water reservoir 66 for collecting waste water during use. As shown, the fender substantially surrounds the brush 34 and spray tube 58 so that water sprayed by the rotating brush during cleaning operation is directed into the reservoir 66.

In the preferred embodiment shown, the fender 64 has a double lip sealing strip 67 attached thereto at the lower edge thereof. The strip 67 preferably runs the length of the device 67, and forms a seal with the building surface 22 during cleaning operation. Thus, water flowing down surface 22 during use will be directed into the reservoir 66. Preferably, the double lip 67 is sliced with the slits being staggered, as more fully explained below in relation to FIG. 11.

Also, as best shown in FIG. 2, the device 20 may include a narrow strip brush 77 at each side of the device to prevent water from spraying outside the lateral boundaries of the device during operation. Thus, in the preferred embodiment shown, the strip brushes 77, the sealing strip 67, and the inward-spiraling pattern of the brush 34 all combine to keep the rinse water substantially within the confines of the invention during use. This helps keep the surfaces of the building adjacent and below the one being cleaned from being dirtied by waste water during cleaning operation.

Waste water may be removed from the device 20 via a flexible waste water line (not shown) attached at its upper end to the bottom of the waste water reservoir 66, and at its other end spooled around recoil apparatus anchored to the ground. A drain line in turn may be connected to the recoil system to deliver the water into a street drain. In operation, as the device 20 is lowered, the recoil system may rotate to take up the slack in the waste water line, and as the device 20 is raised, recoil system may rotate in the opposite direction to allow the waste water line to be pulled by the device 20. This type of waste water drainage system is particularly useful in association with relatively short buildings (e.g., 20 stores or less), which often do not have centralized roof drainage systems.

Figure 8:
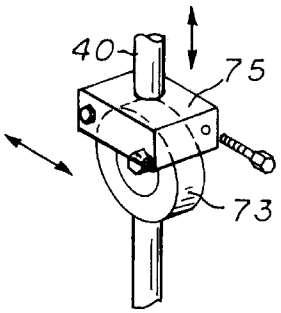
FIG. 8 is a fragmentary, perspective view of the device of FIG. 2, illustrating a wheel assembly.

The device 20 may include a plurality of wheels 73, which support the device against the building surface 22 during use. As shown in FIG. 8, each wheel 73 is preferably mounted to an adjustable box 75, which in turn is slidably mounted to the frame 40 of the device. The wheel 73 may be adjusted vertically or laterally as desired.

Alternatively, the wheels may be universal wheels attached to the housing frame by a swivel assembly capable of rotating 360°, so that the wheels can rotate when the device is raised, lowered, or moved laterally.

Preferably, the wheels are made out of a non-marking balloon cushioned rubber, and are supplied with a grease fitting for ease of maintenance. Their dimensions may be, for example, 7¼ inches in height and 6 inches in diameter.

In operation, the device 20 begins at the top of the building. Water supply from the deionizer 55 is turned on to begin the flow of substantially pure water through supply line 56 to the device 20, where the water is ejected through nozzles 60 for rinsing the building surface 22. Drive motor 48 is switched on to begin rotation of the brush 34 to scrub the building surface 22. The device 20 is lowered by rolling out suspension cable 32, so that the device cleans a vertical section of the building.

During operation, waste water may exit reservoir 66 via a waste water line to drain to the ground. The slack in waste water line may be taken up by a recoil apparatus during the device's descent, as described above. After the device 20 has completed its descent, and thereby cleaned a vertical section of the building, the water and electrical supply may be shut off and the device may be moved laterally to the next adjacent section of the building to be cleaned. The device 20 may then be raised to the top of the building and the cleaning operation repeated.

FIGS. 9–12 illustrate a preferred embodiment of an articulated washer device as provided by the present invention. This embodiment is particularly suited for washing buildings having adjacent angled or curved surfaces.

Figure 9:
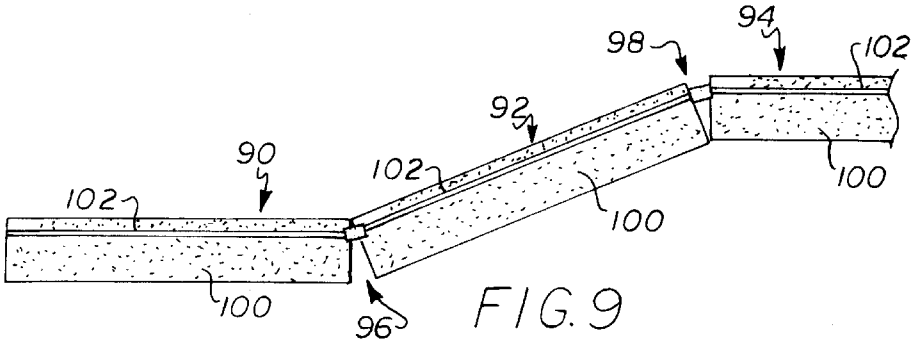
FIG. 9 is a partially sectional, plan view of an articulated washer device as provided in a preferred embodiment of the present invention.

Referring particularly to FIG. 9, the device includes three sections, 90, 92, 94 pivotally connected to one another at joints 96 and 98. The sections may be pivoted at the joint to conform to an angled surface of a building to be cleaned. Each section includes cleaning means (similar to that described in connection with the unarticulated embodiment) operatively connected at the joints 96 and 98. Thus, each section includes a brush section 100, a spray tube section 102, and waste water reservoir sections (not shown).

A single drive motor (not shown) may be provided in associated with one of the end sections 90 or 94 to rotate all three brush sections 100 as will be further described below. The articulated device may be suspended from the top or upper portion of a building to be cleaned by attaching suspension cables to each section 90, 92, and 94.

Figure 10:
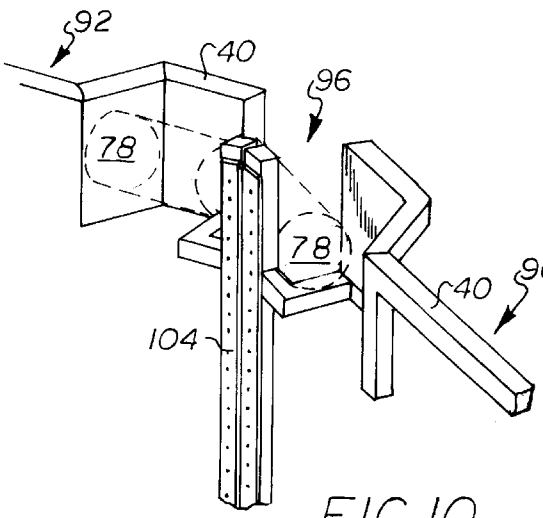
FIG. 10 is a fragmentary, perspective view taken at the position shown in FIG. 9, illustrating a connecting joint in the frame between two articulated sections of the device.

Referring now to FIG. 10, the connecting joint of the housing frame 40 is illustrated. A hinge 104 is mounted to the adjacent sections of the frame 40 so that the angular relationship between sections 90 and 92 may be adjusted as dictated by the geometry of the building surface to be cleaned. Preferably, the hinge 104 is releasably lockable at various angles to provide rigidity to the joint during use. Universal wheels 78, similar to those described above, may be provided for supporting each section of the articulated device onto the surfaces to be cleaned.

Figure 11:
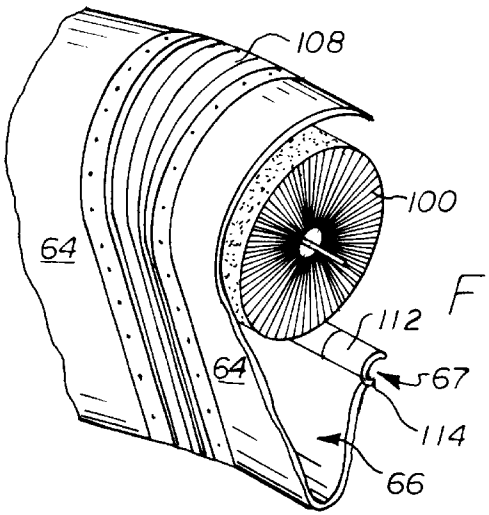
FIG. 11 is a fragmentary, perspective view of the articulated device shown in FIG. 9, illustrating connection of fender/reservoir sections in the device.

FIG. 11 illustrates connection between fender sections 64 of the articulated device. Each fender section 64 is similar in design to the fender described above in connection with the unarticulated embodiment. In the articulated device, fender sections 64 are connected by a flexible accordion rubber piece 108 suitably attached to each fender section 64.

FIG. 11 provides a good view of the preferred double-lip rubber seal 67 provided along the top edge of waste water reservoir 66. The upper and lower lips 112 and 114 are preferably slit to provide a better seal when the building surface to be cleaned has ridges or other irregular protrusions from a flat surface. The slits in the upper lip 112 may be staggered in relation to those in the lower lip 114.

Figure 12:
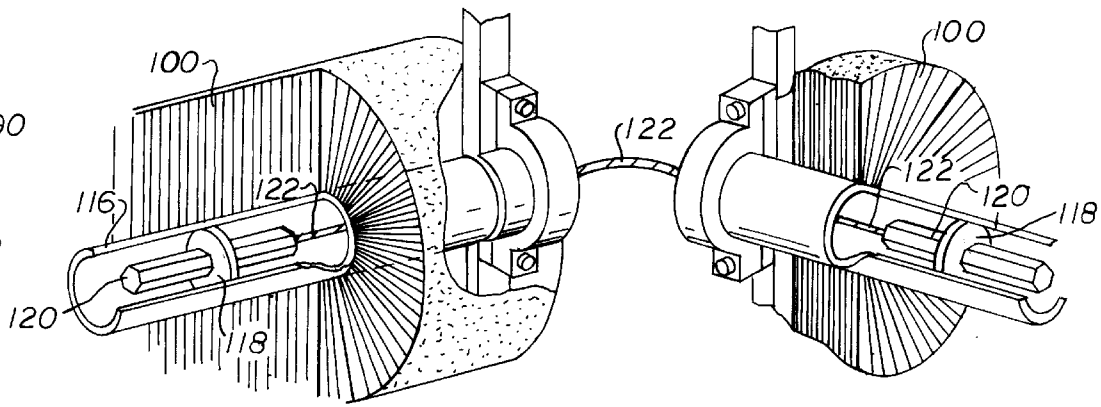
FIG. 12 is a fragmentary, partially sectional, perspective view of the articulated device shown in FIG. 9, illustrating connection of brush sections in the device.

FIG. 12 illustrates connection between brush sections 100 of the articulated device. A flexible power shaft arrangement is provided through the brush sections 100 so that rotating of one of the brush sections by the drive motor will in turn drive rotation of the adjacent brush sections. Thus, all three brush sections may be rotated with the use of a single motor.

As illustrated in FIG. 12, each brush section 100 includes a hollow shaft 116. Inside the shaft 116, a drive wheel 118 is rigidly mounted to the interior surface. A hex fitting 120 extends through a hex shaped hole in the drive wheel 118. The hex fitting 120 is free to slide laterally relative to the drive wheel 118. The hex fitting 120 is connected to flexible drive cable 122 which leads out of shaft section 116 to the next adjacent shaft section, where it is similarly mounted to another hex fitting. As will be apparent, rotation of the shaft 116 by a drive motor will rotate hex fitting 120, which will rotate flexible drive cable 122. The flexible drive cable will in turn rotate the hex fitting in the next adjacent section, which will rotate the brush section of that section. A similar flexible power shaft arrangement is provided between each adjacent sections of the articulated device.

Since the hex fitting 120 is slidable relative to drive wheel 118, adjacent sections can be pivoted without providing too much tension on the drive cable 122. Thus, if it is desired to bend a joint of the articulated device, the hex fittings 120 may slide laterally to provide or take up slack in the flexible drive cable 122.

Referring back to FIG. 9, adjacent spray tube sections 102 are connected end to end at the joints by a flexible hose. The housing cover may be provided with a flexible accordion piece so that the sections can be pivoted inward or outward, similar to that described above in connection with FIGS. 1–8.

FIGS. 13 and 14 illustrate a preferred suspension and tracking system for use in connection with the present invention. As shown, a washing unit 124 is suspended from a building top 126 by suspension apparatus 127. The washing unit 124 is similar in structure and operation to the washing device illustrated in FIGS. 1–8.

The washing unit 124 is suspended by means of suspension cables 128 coiled around recoil spools 130. The spools 130 are securely mounted to a wheeled platform or shelf 134. Each cable 128 is directed through a pulley system mounted onto a davit 132 (as shown in FIG. 14) so that the suspended washing unit 124 may be raised and lowered along the building surface 136 to be cleaned. Each davit 132 is securely mounted at one end to the platform 134.

Substantially pure water may be supplied to and returned from the washing unit 124 by water supply and return lines 138 and 140. The water and supply lines are coiled around a recoil spool 142 mounted to the platform 134. (Alternatively, separate recoil spools could be used for the water supply and return lines). At the top of the building, the water supply line 138 may be attached to an ionizer leading to a water source (not shown), and the water return line 140 may lead to a drain (not shown). An automatic valve (not shown) may be provided in connection with the water supply line for controlled adjustment of water flow to the washing device 124. A lateral extension and pulley wheel 144 are attached to one of the davits 132 at its upper end for guiding the water supply and return lines 138 and 140 to the washing unit 124.

A recoil spool 146 and electrical cable 148 are also provided to supply electricity to the washing unit 124. The electrical cable 148 is fed over a lateral extension and pulley wheel 150 which is connected to the other davit 132. The recoil spool is mounted to the wheeled platform 134.

As stated above, each of the spools 130, 142, and 146 are anchored to platform 134. The platform 134 is in turn slidably mounted into a tracking system which will be described below. The tracking system is anchored to the building top proximate its top circumferential edge.

The washing system includes a variable speed motor 152 mounted to the platform 134. The motor is connected to a drive shaft which extends throughout the axially aligned spools as shown in FIG. 11. The motor is operable to rotate the drive shaft and therefore roll out or roll in the suspension cables, water supply and return lines, and electrical cable. This resultantly raises or lowers the washing unit 124. The motor may be, e.g., a 1 Hp/120 v, single phase, variable drive motor.

The tracking system, which allows convenient lateral repositioning of the washing unit 124, will now be described. Platform 134 is supported upon a pair of drive wheels 156 and a pair of free wheels 158. The wheels are positioned between two tracking rails 160 and 162 which are securely anchored to the building top 126. Tracking rail 160 is "S-shaped," and the top flange anchors the suspension apparatus 127 by resisting the torque rotational force exerted by the weight of the suspended washing unit 124.

Means for indexing or transporting the suspension apparatus 127 laterally within the tracking system is provided in the form of a tracking motor 164 connected via drive belt 166 to wheel axle 168. The motor 164 is mounted to platform 134, and is operable to rotate drive wheel 156 to move the suspension structure 127 laterally. Wheel 158 is freely mounted to axle 168, since in operation it will rotate in the opposite directions of the drive wheel 156. This will be apparent since free wheel 158 actually rides along the upper flange of tracking rail 160 in motion, due to the torque force exerted on the suspension apparatus 127 by the weight of the suspended washing unit 124.

The washing system also includes a controller 166 which controls the electrical and water input into the system. The controller may be programmed to sequentially control the cleaning operation as follows. The system begins its sequence with the washing unit 124 raised to the top of the building surface 136 to be cleaned, as shown in FIGS. 13 and 14. The controller 166 begins the cleaning mode by switching on the water supply valve to begin water flow to the washing unit 124 through water supply line 138. Concurrently, the controller 166 switches on the electrical supply to electric cable 148, to activate the scrubbing brush contained within the housing of the washing unit 124.

At this point, the roll-out motor 152 is switched on and rotated (in the clockwise direction in the view shown in FIG. 14) to lower the washing unit 124, thereby traversing a vertical section of building surface 136. The washing unit 124 operates to clean the vertical section of the building surface 136 as the unit descends.

When the washing unit 124 reaches the bottom of its descent, the controller 166 shuts off the water supply, and turns off the brush and roll-out motor. The controller 166 then activates the tracking motor 164 to index the suspension structure 127 laterally within the tracking system a distance approximately the width of the washing unit 124. This effectively repositions the system so that the washing unit 124 may traverse the next adjacent section of the building surface 136.

The roll-out motor 152 is then again turned on by the controller 166, but is rotated in the opposite direction (i.e., counterclockwise in the view shown in FIG. 14) to raise the washing unit 124 back to the top of the building. The cleaning mode is then reactivated and the steps are repeated until the system has been indexed a selected distance around the top circumferential edge of the building, cleaning the desired surfaces.

Figure 15:
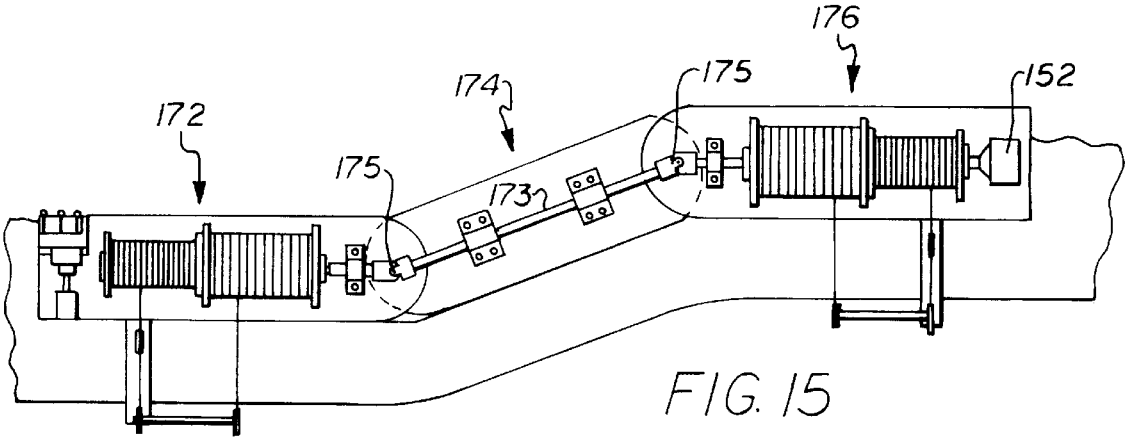
FIG. 15 is a plan view of a preferred embodiment of suspension apparatus designed for use with an articulated washer device such as that shown in FIG. 9.

FIG. 15 illustrates suspension apparatus for use with an articulated washing unit, such as that illustrated in FIGS.

9–12. This suspension apparatus is similar to that illustrated in FIGS. 13 and 14, except that it is articulated into three sections 172, 174 and 176 to conform to the geometry of the building top. The drive shaft 173 is similarly segmented into three corresponding sections, and the shaft sections maintain rotational power throughout the drive shaft by universal joints 175.

It should be noted that the suspension apparatus illustrated in FIG. 15 also differs from that shown in FIGS. 13 and 14 in the location of the roll-out motor 152. In FIGS. 13 and 14, the motor 152 is positioned proximate the middle of the apparatus between the recoil spools. In FIG. 15, the motor is positioned proximate one end of the apparatus on one side of all of the spools. Location of this motor is a matter of design choice.

EXAMPLES

The following examples are designed to illustrate certain aspects of the present invention. The examples are not intended to be comprehensive of all features and all embodiments of the present invention, and should not be construed as limiting the disclosure presented herein.

EXAMPLE I

In connection with developing this invention, a detailed study of the mechanism of water borne deposits was conducted. The photographs of FIGS. 16–19 illustrate the deposition process, and compares cleaning results with and without treated wash water.

Figure 16:
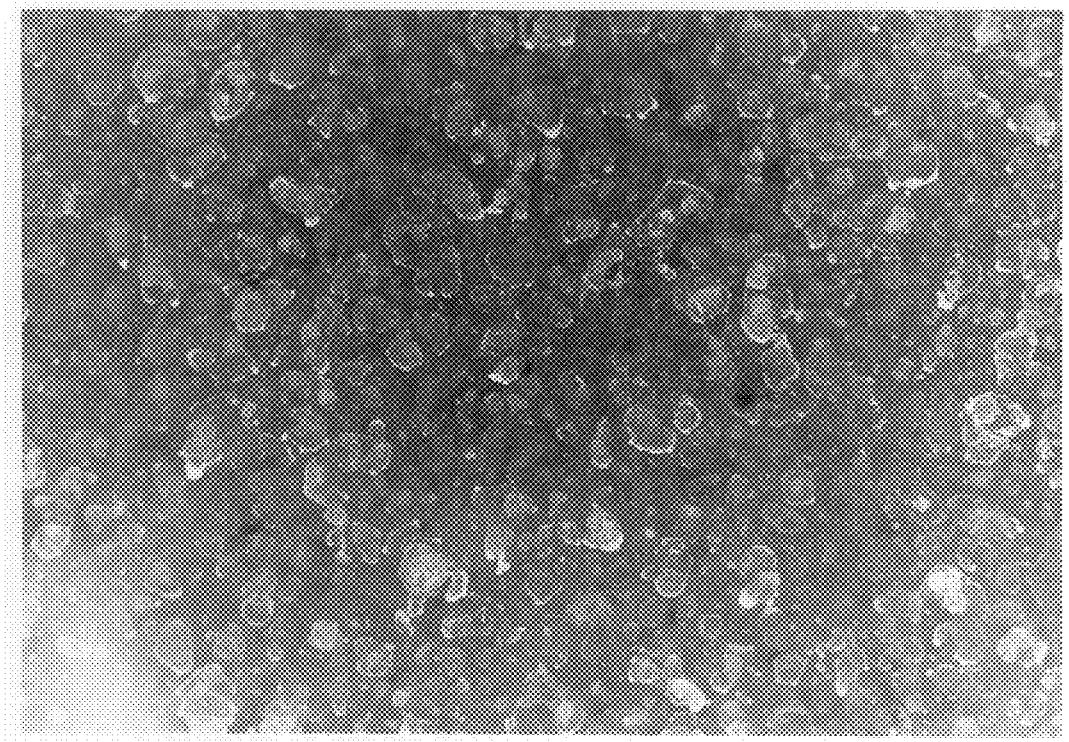
FIGS. 16–19 are photographs of window surfaces before and after cleaning by the techniques of this invention, as explained in detail in connection with Example I.

FIG. 16 shows typical water borne mineral deposits commonly known as "water spots." Initially the deposits are barely visible. However, after repeated wetting the solids build up and are difficult to remove.

Figure 17:
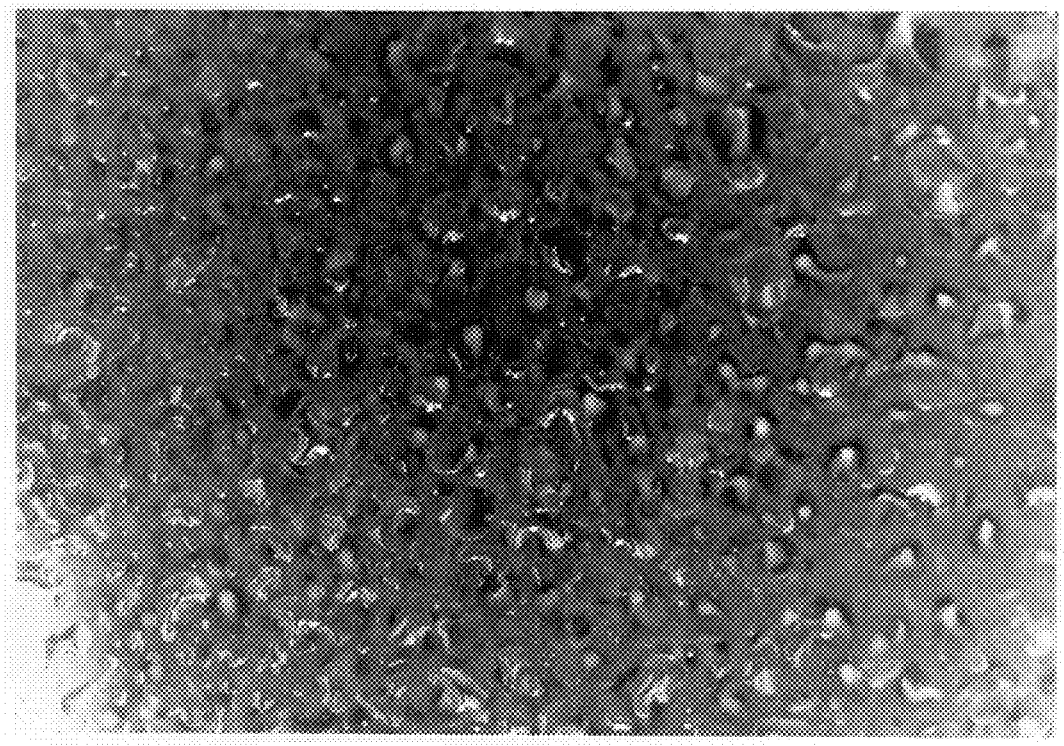

FIG. 17 shows the same surface after it was re-wetted. The residual water droplets were attracted to the old water spot configuration and upon drying left additional solids in substantially the same pattern of the previous spots.

Figure 18:
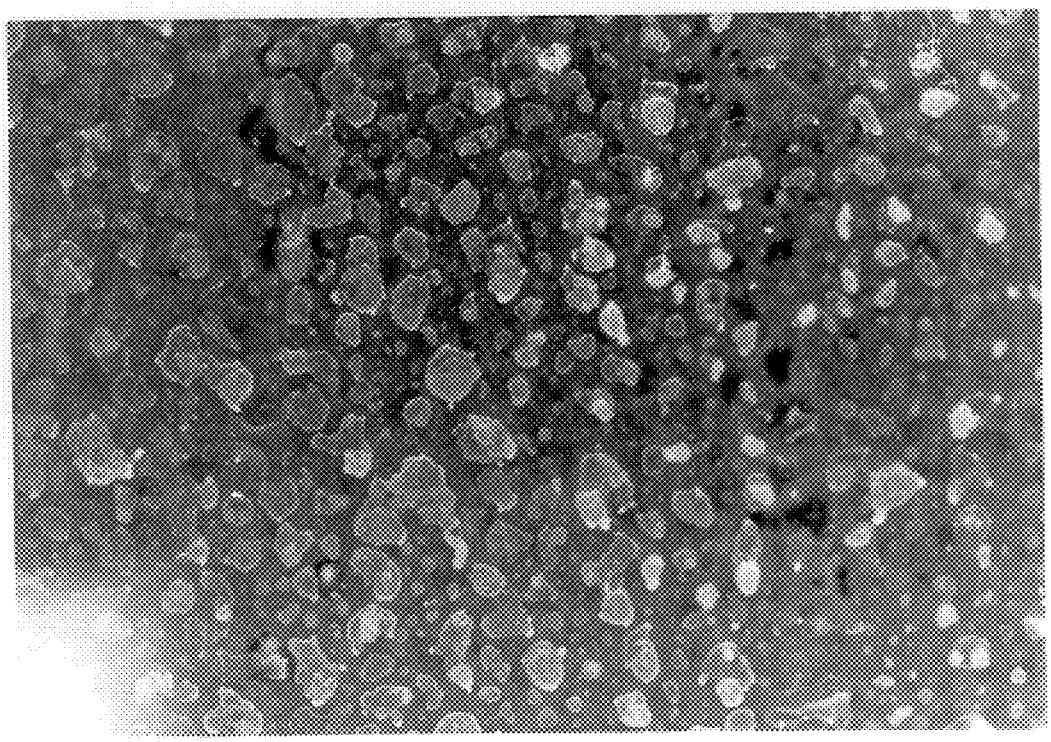

FIG. 18 shows a window cleaned and dried by a conventional mechanical device using city water. The water spots remained.

Figure 19:
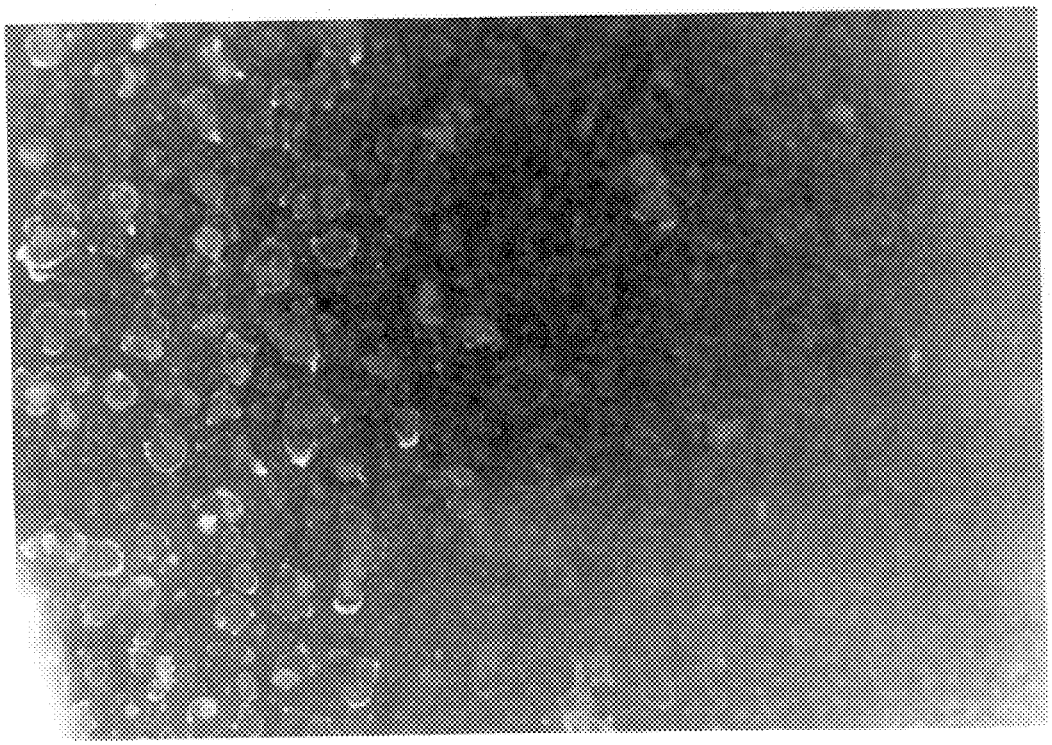

FIG. 19 shows one section of the same glass cleaned with the technique of the present invention. Cleaning water was not removed from the glass, but due to special treatment no solids were left, and much of the old deposits were removed. The right hand section of FIG. 19 shows an area cleaned with the technique of this invention, while the left hand section shows an area cleaned by conventional mechanical means.

EXAMPLE II

Table I compares mineral content and other physical characteristics of a typical public water supply, water conditioned for use as provided by this invention, and conditioned water after washing a building surface as contemplated by this invention. The wash water in the second column was conditioned by processing through a mixed bed ion exchange unit containing strong acid cation and strong base anion resins. The third column was actual water collected from the surface of a six story all-glass building.

Comparing the first and second columns shows that the mineral content of the public water supply examined is significantly higher than the conditioned water. Also, comparing the second and third columns indicates that significant amounts of built up mineral deposits were removed from the surface by the cleaning process of this invention.

TABLE 1

| | Typical Public Water Supply | Conditioned Wash Water | Disposal Wash Water |
|---|---|---|---|
| pH | 8.1 | 6.5 | 6.4 |
| Hardness (PPM $CaCO_3$) | 180 | <0.02 | 22 |
| Calcium (PPM $CaCO_3$) | 140 | <0.02 | 18 |
| Magnetium (PPM $CaCO_3$) | 40 | <0.01 | 4 |
| Alkalinity (PPM $CaCO_3$) | 125 | <0.01 | 32 |
| Ch1orides (PPM Cl) | 24 | <0.01 | 5 |
| Sulfates (PPM $SO_4$) | 8 | <0.01 | 41 |
| Total Solids (PPM) | 430 | <0.3 | 250 |
| Dissolved Solids (PPM) | 445 | 0.0 | 80 |
| Suspended Solids (PPM) | 5 | 0.0 | 170 |
| Conductictivy (Micromhos) | 480 | 0.6 | 125 |

This invention has been disclosed in connection with specific embodiments. However, it will be apparent to those skilled in the art that variations from the illustrated embodiments may be undertaken without departing the spirit and scope of the invention.

What is claimed is:

1. A system for washing windows and other exterior surfaces of a building, comprising:

a washing unit having wheels on one side for rolling engagement on the exterior surface of a building and containing a drive motor operatively connected to a power supply, water spray means connected to a water supply for spraying water onto the building surface, and brush means operatively connected to said motor to be rotatably driven thereby for scrubbing the building surface;

deionizing means connected between the water supply source and said washing unit for delivering substantially deionized water to the water spray means;

at least one suspension line connected to said washing unit for suspending said washing unit in vertically movable relation to the building surface to be washed;

raising and lowering means operatively connected to said suspension line for raising and lowering said washing unit relative to the building surface to be washed;

a restraining cable extending above and below said washing unit and passing slidably over an outer surface thereof to maintain said washing unit firmly engaged against the building surface to be washed in horizontally biased vertically movable relation, said restraining cable connected at its upper end to the building to be washed;

lower pulley means releasably secured closely adjacent the exterior surface of the building to be washed at a position below said washing unit for receiving the lower end of said restraining cable; and a free weight attached to the lower end of said retaining cable below said lower pulley means to apply sufficient tension in said restraining cable to exert pressure against said washing unit to bias said washing unit against the building surface to be washed in vertically movable relation.

2. The system of claim 1, wherein said lower pulley means comprises a pulley secured to a suction cup which is adapted to be releasably secured to the exterior surface of the building to be washed.

3. The system of claim 1, including a tensioning pulley mounted on an outer side of said washing unit for receiving a mid portion of said restraining cable;

a compression spring connected between said washing unit and said tensioning pulley urging said tensioning pulley and washing unit apart to compensate for changing forces in said restraining cable and irregularities in the building surface and constantly maintain said washing unit firmly engaged against the building surface to be washed as it moves vertically on the building surfaces between the upper and lower ends of said restraining cable.

4. The system of claim 1, wherein said brush means comprises a brush having bristles oriented in a helical pattern with right and left pitch, such that upon rotating said brush in use in a downward direction against the building surface, the water will be directed toward the center of said washing unit.

5. The system of claim 1, wherein said deionizing means and the water supply source are operably connected to deliver deionized water having a dissolved solids content less than about 200 parts per million to said washing unit at a rate of from about 0.5 to about 3 gallons per 100 square feet of surface area cleaned.

6. The system of claim 1, wherein said deionizing means and the water supply source are operably connected to deliver deionized water having a dissolved solids content less than about 200 parts per million to said washing unit at a rate of from about 1 to about 1.5 gallons per 100 square feet of surface area cleaned.

7. The system of claim 1, wherein said washing unit includes an outer housing having a trough for collecting waste water, and drain means associated with said washing unit trough for removal of waste water during use.

8. The system of claim 7 wherein said washing unit outer housing has a seal element along one side facing the building surface being washed to form a water seal therewith for directing waste water into said trough during the washing operation.

9. The system of claim 1, wherein said washing unit is articulated into a plurality of hinged sections movable with respect to one another and releasably lockable at various angles for cleaning adjacent angled surfaces of a building.

10. The system of claim 9, wherein said brush means is articulated into a plurality of brush sections movable with said hinged washing unit sections for scrubbing adjacent angled surfaces of a building.

11. The system of claim 1 wherein the water used in the washing operation is purified such that its dissolved solids content is less than about 200 parts per million.

12. The system of claim 1 including brush adjustment means operatively connected to said brush means to move same relative to said washing unit and to the building surface to be washed for selectively adjusting the brush contact pressure against the building surface to be washed.

*13. A system for washing windows and other exterior surfaces of a building, comprising:*

*a washing unit including scrubbing means for scrubbing such a building surface, a spray tube having a plurality of spray nozzles for spraying water on the scrubbed building surface, and a pulley system mounted on an outer side of said washing unit;*

*at least one suspension line connected to said washing unit for suspending said washing unit in vertical movable relation to the building surface;*

*at least one restraining cable extending above and below said washing unit and passing slidably over said pulley system to maintain said washing unit firmly engaged against the building surface to be washed;*

*means for causing the washing unit to traverse the building surface to be washed;*

*water supply means for delivering water to the washing unit; and*

*water purifying means associated with the water supply means for substantially purifying water such that the water delivered to the washing unit is substantially deionized or demineralized.*

*14. The system of claim 13, wherein the scrubbing means comprises a brush rotatably mounted in the washing unit, the brush having bristles oriented in a helical pattern with right and left pitch, such that upon rotating the brush in use in a downward direction when going down and in an upward direction when going up against the building surface, the rinse water will be directed toward the center of the washing unit.*

*15. The system of claim 13, wherein the water supply means is operable to deliver water to the washing unit at a rate of from about 0.5 to about 3 gallons per 100 square feet of surface area cleaned.*

*16. The system of claim 13, wherein the washing unit includes a trough for collecting waste water, and the system further comprises means operatively associated with the washing unit for removal of waste water from the trough during use.*

*17. The apparatus of claim 13, wherein said pulley system includes a pulley and a spring connected between said pulley and said washing unit thereby causing said pulley to extend or retract in response to pressure exerted on said pulley by said restraining cable.*

*18. The apparatus of claim 17, wherein said washing unit is articulated into at least two hinged sections movable with respect to one another.*

*19. An apparatus for washing windows on other exterior surfaces of a building, comprising:*

*a washing unit including a pulley system mounted on an outer side of said washing unit, spray means for spraying water on the building exterior surface, and a scrubbing means for scrubbing the building exterior surface, said spray means including a spray tube having a plurality of spray nozzles, said scrubbing means including a brush rotatably mounted in the washing unit, said brush having bristles oriented in a helical pattern with right and left pitch, such that upon rotating the brush in use in a downward direction against the building surface, the rinse water will be directed toward the center of the washing unit;*

*means for suspending said washing unit in contact with the building surface whereby said stray nozzles are oriented above said brush;*

*a restraining means including at least one restraining cable extending above and below said washing unit and passing slidably over said pulley system to maintain said washing unit firmly engaged against the building surface to be washed;*

*means for causing said washing unit to traverse the building surface to be washed; and*

*water supply means for delivering substantially deionized or demineralized water to said washing unit.*

*20. The apparatus of claim 19 wherein said water contains less than about 200 parts per million of dissolved solids.*

*21. The apparatus of claim 20 wherein said water contains less than 20 parts per million of dissolved solids.*

*22. The apparatus of claim 19 wherein said water contains less than 100 parts per million of dissolved solids.*

*23. The apparatus of claim 22 wherein said spray tube is 3 to 10 inches from the point said brush contacts the building exterior surface.*

*24. The apparatus of claim 19, wherein said pulley system includes a pulley and a spring connected between said pulley and said washing unit thereby causing said pulley to extend or retract in response to pressure exerted on said pulley by said restraining cable.*

*25. The apparatus of claim 24, wherein said washing unit is articulated into at least two hinged sections movable with respect to one another.*

*26. A system for washing windows and other exterior surfaces of a building, comprising:*

*a washing unit including a brush for scrubbing such a building surface, a spray tube having a plurality of spray nozzles for spraying water on the scrubbed building surface, and a pulley system mounted on an outer side of said washing unit, said pulley system including a pulley mounted on a compressible member;*

*at least one suspension line connected to said washing unit for suspending said washing unit in vertical movable relation to the building surface;*

*at least one restraining cable extending above and below said washing unit and passing slidably over said pulley thereby causing said pulley to move in response to pressure exerted on said pulley by said restraining cable to thereby maintain said washing unit firmly engaged against the building surface to be washed;*

*a lift mechanism connected to said suspension line; and*

*water supply means for delivering water to the washing unit.*

* * * * *